United States Patent [19]
Sung et al.

[11] Patent Number: 6,023,469
[45] Date of Patent: Feb. 8, 2000

[54] IDLE ADDRESS CONTROLLER FOR SHARED BUFFER TYPE ATM SWITCH

[75] Inventors: Dan-Keun Sung; Kyeong-Ho Lee; Soo-Jong Lee; Tae-Won Kim; Jeong-Won Heo, all of Daejeon; Sung-Hyuk Byun, Siheung; Ju-Yong Lee, Daejeon, all of Rep. of Korea

[73] Assignees: Electronics and Telecommunications Research Institute, Daejeon; Korea Telecom, Seoul, both of Rep. of Korea

[21] Appl. No.: 08/874,822

[22] Filed: Jun. 13, 1997

[30] Foreign Application Priority Data

Oct. 22, 1996 [KR] Rep. of Korea ................... 96-47442

[51] Int. Cl.[7] .................................................. H04L 12/54
[52] U.S. Cl. ............................................................ 370/398
[58] Field of Search ..................................... 370/398, 389, 370/390, 392, 395, 412, 415, 416, 422

[56] References Cited

U.S. PATENT DOCUMENTS

Re. 34,305  7/1993  Sakurai et al. ........................... 370/395

OTHER PUBLICATIONS

Wu, Jung–Shyr, et al. ATM Shared Memory Switch and Multicasting Balancing, IEICE Trans. Commun. vol. E78–B, No. 9, Sep. 1995.

Wu, Jung–Shyr, et al. Traffic Management Circuit for the Shared Buffer Memory Switch with Multicasting, Computer Communications, vol. 16, No. 11, Nov. 1993.

Endo, Noboru, et al. Shared Buffer Memory Switch for an ATM Exchange, IEEE Transactions on Communications, vol. 41, No. 1, Jan. 1993.

*Primary Examiner*—Huy D. Vu
*Assistant Examiner*—Dung Trinh
*Attorney, Agent, or Firm*—Cohen, Pontani, Lieberman & Pavane

[57] ABSTRACT

An idle address controller for a shared buffer type ATM switch controls the addresses of output cells in a common memory to be stored directly in an idle address buffer without passing through the conventional idle address delay controller, by improving the idle address control scheme of a unit switch. The idle address controller includes an idle address control signal generator for generating idle address control signals based on the buffer length information from counters, idle address control signal buffers for storing the idle address control signals, and an idle address control signal multiplexer. Therefore, the idle addresses can be efficiently provided, and this mechanism lowers cell loss and reduces required memory capacity.

2 Claims, 3 Drawing Sheets

IDLE ADDRESS CONTROLLER FOR SHARED BUFFER TYPE ATM SWITCH

BACKGROUND OF THE INVENTION

The present invention relates to an idle address controller for a shared buffer type asynchronous transfer mode (ATM) switch, and more particularly, to an idle address controller for a shared buffer type asynchronous transfer mode (ATM) switch which can directly store common memory addresses of output cells in an idle address buffer by improving a conventional idle address control scheme of a unit switch.

Conventional limited shared buffer type ATM switches are controlled so that a common memory address of an output cell, which is read from a common memory is temporarily stored in an idle address delay controller and then is sent to an idle address buffer. However, since an idle address is not sent to the idle address buffer directly, the idle address may not be allocated, and thus it may disable the idle address from accessing the common memory, although the memory space where the idle address can be stored is available in the common memory. In addition, a large capacity memory is required for this idle address delay controller.

SUMMARY OF THE INVENTION

It is an object of the present invention to reduce cell loss by providing idle addresses efficiently in such a manner that a common memory address of an output cell is stored directly in an idle address buffer without passing through an idle address delay controller.

To accomplish the objects of the present invention, this invention is to provide an idle address control mechanism comprising: an idle address buffer for storing idle addresses; and an idle address controller for generating an idle address control signal and transmitting the generated idle address control signal to the idle address buffer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinbelow, detailed embodiments of the conventional art and present invention will be described in detail with reference to accompanying drawings.

Figure 1:
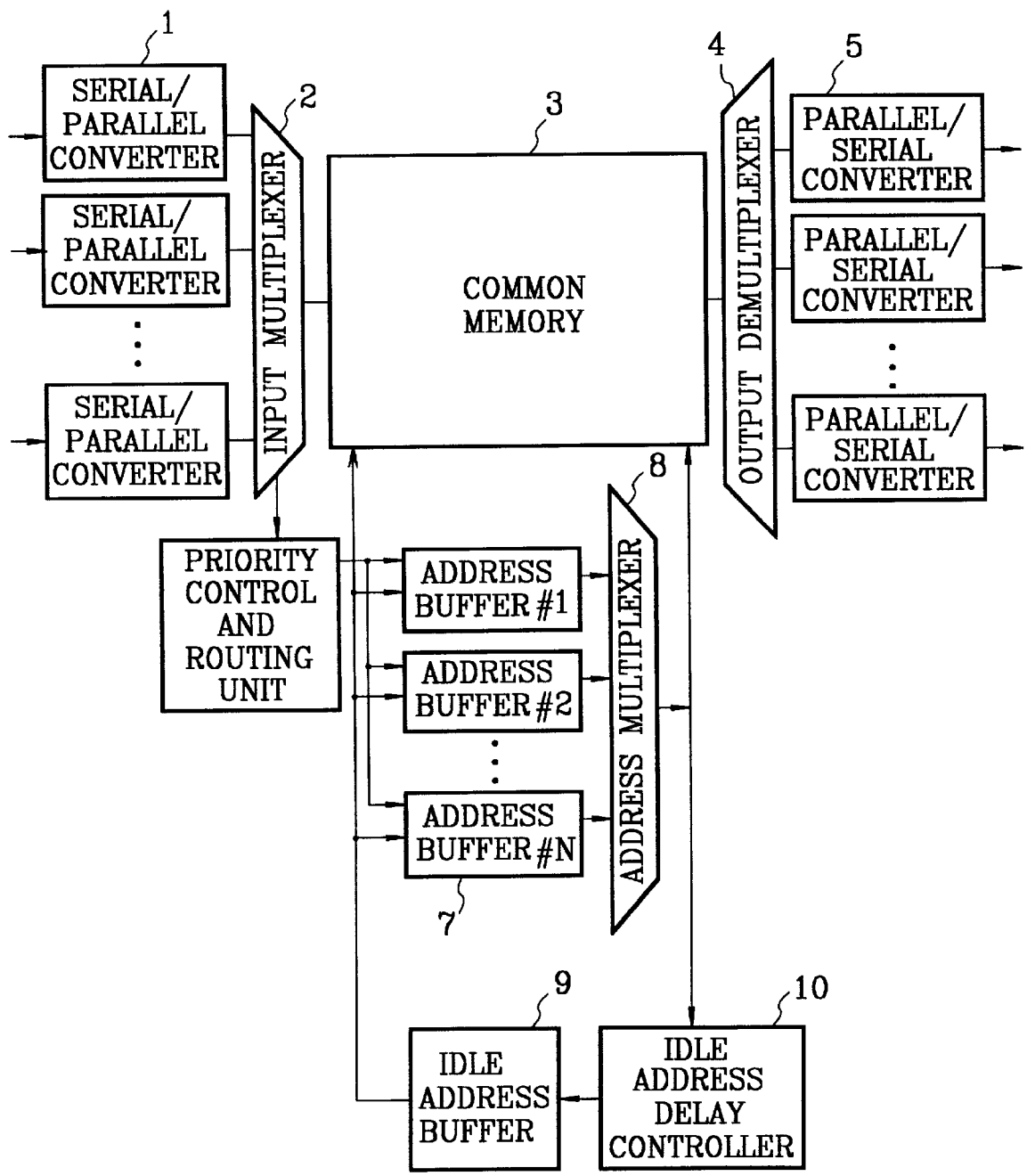
FIG. 1 is a schematic diagram of an N×N unit switch module for a shared buffer type ATM switch.

FIG. 1 is a general schematic diagram of a limited shared buffer type ATM unit switch.

As shown in FIG. 1, the shared buffer type ATM unit switch includes input multiplexing portion 1 and 2 for receiving input cells, serial/parallel converting and multiplexing the same, a common memory 3 for storing the input cells, an output multiplexing portion 4 and 5 for demultiplexing the cell output from the common memory 3, and parallel/serial converting and transmitting the same, and a controlling portion 6 through 10 for performing input/output control of cells, a priority control and a multicast control.

The control portion is largely divided into an input/output controller, a priority control and routing unit, and an idle address controller means.

The priority control and routing unit 6 receives a header of a cell from the input multiplexing portion to control the priority and routes the address of the input cell to be stored in an address buffer 7 corresponding to an output port.

The input/output controller is composed of the address buffer 7 in which the stored address is written, and an address multiplexer 8.

The idle address control part is composed of an idle address buffer 9 in which a usable address of the common memory which can store the input cell is written, and an idle address delay controller 10 for delaying the address of the output cell prior to storing the same in the idle address buffer.

The operational principle of the N×N unit switch for the shared buffer type ATM switch will now be described.

The usable address of the common memory is written in the idle address buffer by being initialized. In this case, if the common memory is capable of storing M cells, addresses 0 to M-1 are written.

Next, the write operation of the input cell onto the common memory will be described. Cells arriving at the respective input ports are multiplexed by the input multiplexing portion, and the header of the cell is sent to the priority control and routing unit.

The priority control and routing unit performs a priority control and then enables the idle address buffer to be operable.

The enabled idle address buffer sends an idle address in which the input cell is to be stored, and the input cell is stored in the output address of the idle address buffer in the common memory.

In the case that the input cell is a unicast cell, the address storing the input cell is stored in the corresponding address buffer. In the case that the input cell is a multicast cell, the address storing the input cell is stored in all corresponding address buffers using multicast route information.

The multicast route information is N-bit information representing which output port the multicast cell is to be sent to, and each bit corresponds to an output port.

For example, assuming that the multicast route information is "10100001" and a multicast cell is sent to the ith output port when the ith bit is 1, in an 8×8 switch (N=8). Since the multicast cells must be broadcast to the first, third and eighth output ports, the addresses are stored in the first, third and eighth address buffers.

Next, the read operation of the stored input cell will be described. The contents stored in the address buffers are read out in a Round-robin basis by a multiplexer 8 to then be used as the read addresses of the common memory.

The addresses of cells read out from the common memory are stored in the idle address buffer via the idle address delay controller for storing next incoming cells. Then, the cell is read out to the corresponding output port via the demultiplexer.

Here, the reason why the addresses of the output cells are stored in the idle address buffer after passing through the idle address delay controller is as follows:

In the case of a multicast cell, the cell is stored once in the common memory and is then read out several times to perform a multicast operation. Thus, the multicast address of the common memory should not be sent to the idle address buffer before the multicast operation is completed.

To solve this problem, the conventional idle address control scheme includes an idle address delay controller for delaying the address information to be stored later in the idle address buffer by the delay amount corresponding to the address buffer size until the multicast operation is completed, thereby assuring the output of the multicast cells.

The idle address controller for the conventional limited shared buffer type ATM unit switch shown in FIG. 1 controls the system so that the addresses of output cells are stored in the idle address buffer 9 after passing through the idle address delay controller 10.

Figure 2:
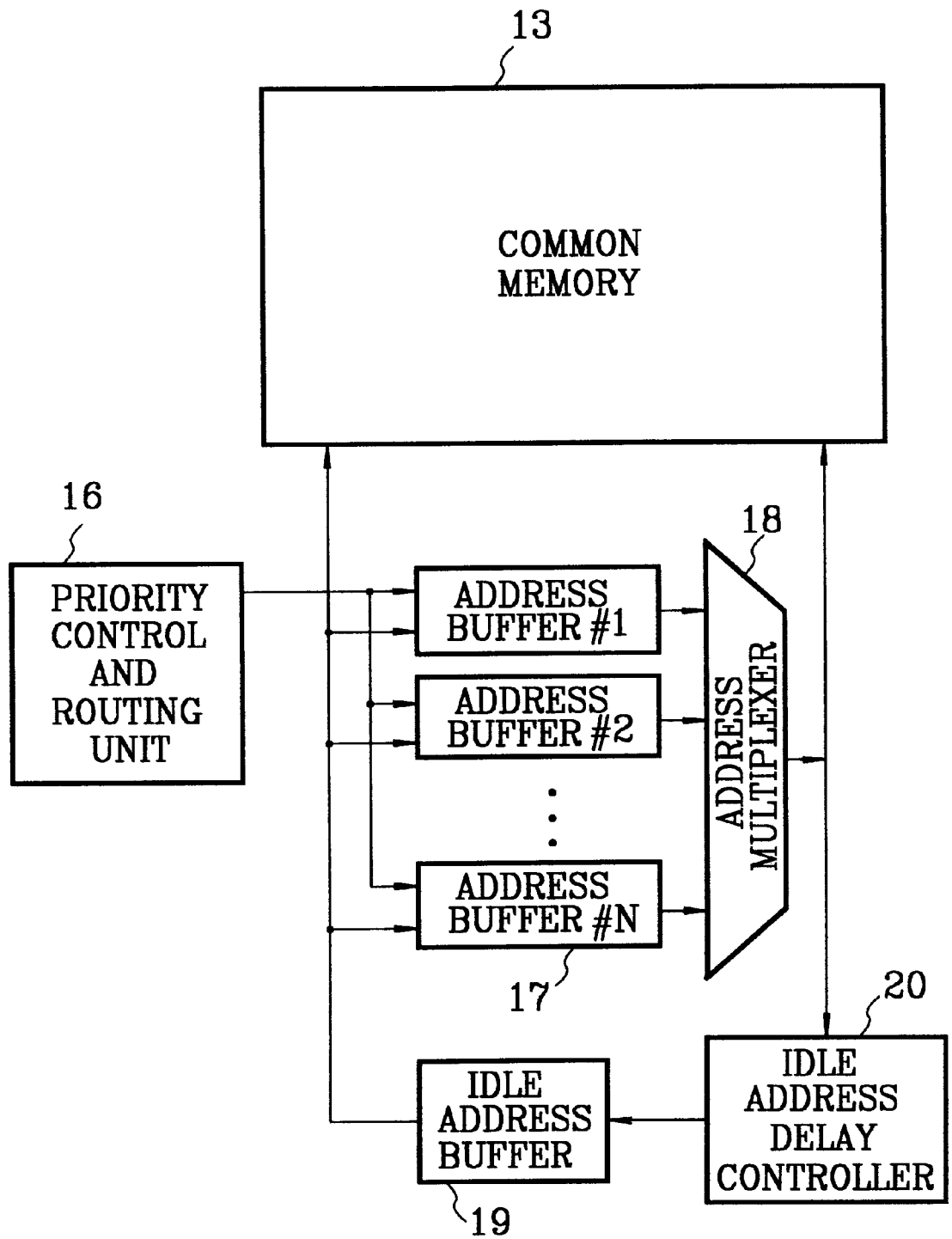
FIG. 2 is a schematic diagram of an idle address controller for a conventional shared buffer type ATM switch.

FIG. 2 shows a schematic diagram of an idle address controller of the conventional shared buffer type ATM switch.

As shown in FIG. 2, the conventional idle address controller for a shared buffer type ATM switch includes an idle address buffer 19 and an idle address delay controller 20.

The conventional idle address delay controller, first, receives the addresses of output cells and always delays them by the delay amount corresponding to the address buffer size. Thus, even though a memory space is available in the common memory, since the idle address cannot be allocated, the input to the common memory may be prohibited sometimes. Further, a large capacity memory which is proportional to the address buffer size (L) and the number (N) of input/output ports is required for the idle address delay controller.

Therefore, for a new idle address controller for a limited shared buffer type ATM unit switch, according to the present invention, there has been proposed an idle address controller which can provide idle addresses efficiently and reduce required memory capacity, by newly adding an idle address controller consisting of an idle address control signal generator, idle address control signal buffers and an idle address control signal multiplexer, without the conventional idle address delay controller.

Figure 3:
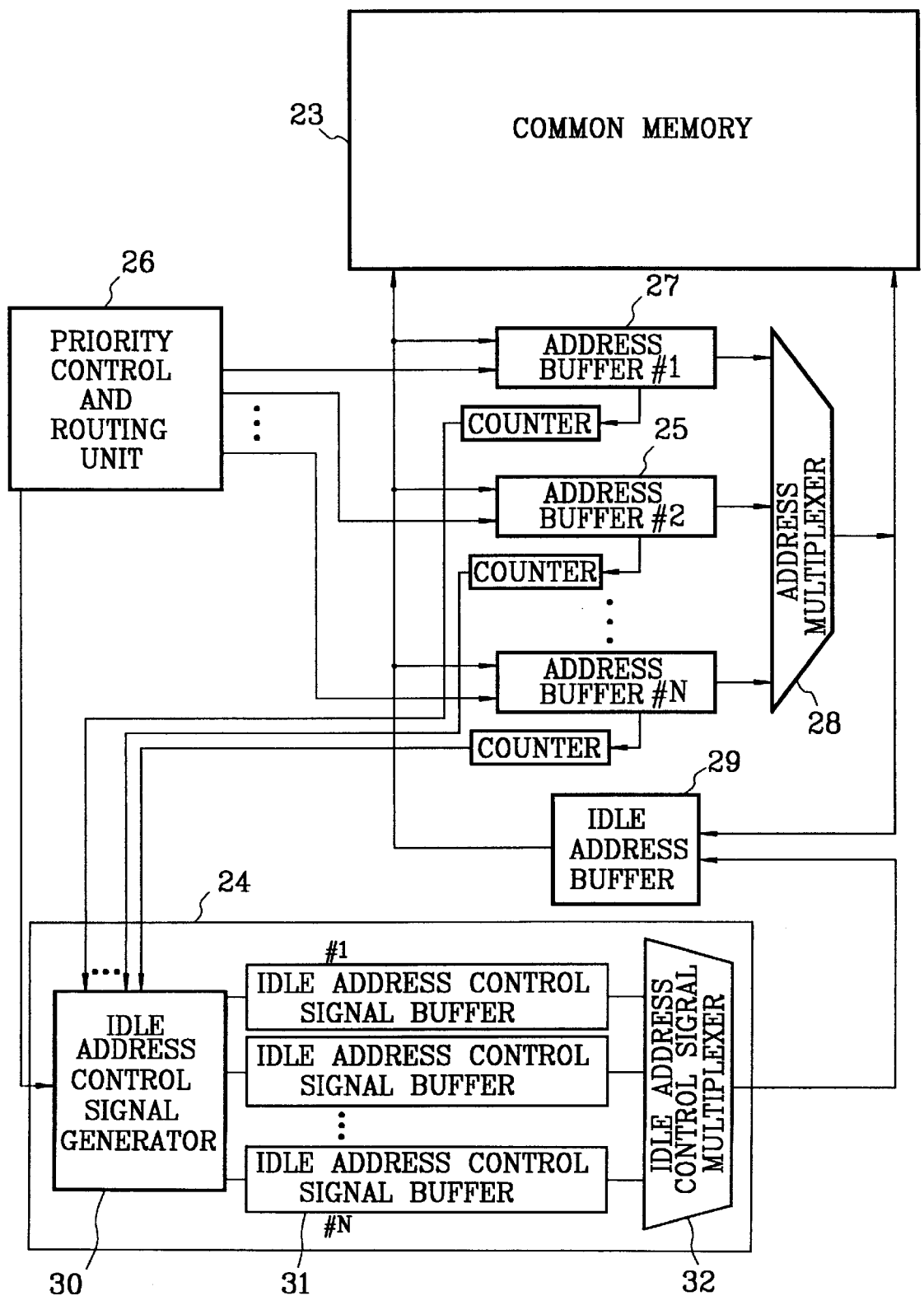
FIG. 3 is a schematic diagram of an idle address controller according to the present invention.

FIG. 3 is a schematic diagram of an idle address controller according to the present invention.

As shown in FIG. 3, compared with the conventional idle address controller, the idle address controller according to the present invention stores an idle address control signal (represented in 1 bit) generated by an idle address control signal generator 30 in idle address control signal buffers 31, and reads the idle address control signal from an idle address control signal multiplexer 32 and then determines by the idle address control signal whether or not the addresses of the output cells are to be stored in the idle address buffer 29, instead of storing the addresses of the output cells in the idle address buffer via the idle address delay controller.

The operational principle of the idle address controller according to the present invention will now be described. A priority control and routing unit 26 transmits unicast route information to the idle address control signal generator 30 in the case of a unicast input cell, and transmits multicast route information to the idle address control signal generator 30 in the case of a multicast input cell.

The idle address control signal generator 30 generates an idle address control signal depending on the unicast cell or multicast cell, using the buffer length information of counters 25 representing the currently occupied buffer length of the respective address buffer 27.

When the input cell is a unicast cell, the idle address control signals generated by the idle address control signal generator 30 are stored in the corresponding idle address control signal buffers 31. When the input cell is a multicast cell, the idle address control signals are stored in the corresponding idle address control signal buffers 31 using the multicast route information.

Thus, for an input cell, the corresponding idle address control signal is stored in each idle address control signal buffer.

The idle address control signal is composed of 1 bit, and is used as the information for determining whether or not the addresses of the output cells are stored in the idle address buffer 29.

The algorithm for determining the idle address control signal in the idle address control signal generator 30 is as follows.

In the case of a unicast cell, since the cell is read only once after it is stored in the common memory, the idle address control signal is generated so that the addresses of all unicast output cells are sent to the idle address buffer 29.

In the case of multicast cells, the idle address control signal is generated so that the address of only the last output cell should be stored at the idle address buffer 29 and the addresses of the other outpu t cells are discarded.

If a multicast cell is multicast to K output ports among N output ports for an N×N unit switch (K≦N), the idle address control signal generator 30 reads from the counters 25 the current buffer length information representing the lengths of K address buffers corresponding to K output ports, and then generates an idle address control signal for the idle address control signal buffer 31 corresponding to the multicast ports, by considering the longest one among K multicast address buffers. The respective counters 25 store buffer length information representing how many addresses are currently stored in the address buffers 27.

When the address of an input cell is sent to an address buffer, the buffer length information is increased by 1. When the address of an output cell is read out from the address buffer, the buffer length information is decreased by 1. In such a manner, the counters 25 always store currently occupied buffer length information.

For example, assuming that in an 8×8 switch (N=8), the multicast route information is "10100001" and a multicast cell is sent to an ith output port when ith bit is 1, since the multicast cells must be sent to the first, third and eighth output ports, the addresses of the input cells are stored in the first, third and eighth address buffers, and the corresponding idle address control signals are stored in the first, third and eighth idle address control signal buffers, where K equals to 3.

It is assumed that the idle address control signal "1" represents that the address of an output cell is to be sent to an idle address buffer, and the idle address control signal "0" represents that the address of an output cell is not to be sent to an idle address buffer. If the third address buffer is the longest among three buffers, only the idle address control signal to be delivered to the third idle address control signal buffer corresponding to its destined output port must be made "1" and the other idle address control signals to be sent to the first and eighth idle address control signal buffers must be made "0." In addition, the idle address control information of the unicast cells is all "1."

Next, the read operation of the stored input cell will be described. The address information from an address multiplexer 28 is used as a read address of the common memory, and the idle address control signals from the idle address control signal buffers 31 and output via the idle address control signal multiplexer 32 are used for determining whether the address of the output cell is stored in the idle address buffer.

According to the present invention having the aforementioned configuration, by improving the idle address controller of the conventional shared buffer type ATM switch, the addresses of output cells in a common memory can be stored in an idle address buffer, without passing through the conventional idle address delay controller, thereby providing idle addresses efficiently, which lowers cell loss and reduces required memory capacity.

What is claimed is:

1. An idle address controller for a shared buffer type asynchronous transfer mode unit switch in an asynchronous transfer mode switch system comprising:

an idle address control signal generator for generating idle address control signals;

idle address control signal buffers connected to said idle address control signal generator for storing the generated idle address control signals;

an idle address control signal multiplexer for reading the idle addresses control signals from said idle address control signal buffers one by one; and an idle address buffer for storing idle address information, wherein addresses of output cells are directly transmitted to said idle address buffer based on said idle address control signals generated by said idle address control signal generator so as to efficiently provide idle address information with reduced cell loss and reduced required memory capacity.

2. The idle address controller in accordance with claim 1, further comprising:

address buffers corresponding to output ports for storing addresses of output cells; and counters for storing a buffer length of said respective address buffers, wherein the idle address control signals generated by said idle address control signal generator for controlling transmission of the addresses of the output cells to said idle address buffer based on the buffer length stored in said counters.

* * * * *